US006986541B1

(12) United States Patent
Haack (10) Patent No.: US 6,986,541 B1
(45) Date of Patent: Jan. 17, 2006

(54) TRUCK BED LINER WITH STORAGE COMPARTMENT

(75) Inventor: Brian Haack, Haslett, MI (US)

(73) Assignee: Blackwood Industries, Inc., Haslett, MI (US)

(*) Notice: Subject to any disclaimer, the term of this patent is extended or adjusted under 35 U.S.C. 154(b) by 0 days.

(21) Appl. No.: 09/473,791

(22) Filed: Dec. 28, 1999

Related U.S. Application Data (63) Continuation-in-part of application No. 08/870,334, filed on Jun. 6, 1997, now Pat. No. 6,015,178.

(51) Int. Cl.
*B62D 33/00* (2006.01)

(52) U.S. Cl. .................. 296/39.2; 296/37.6; 296/37.5; 224/404

(58) Field of Classification Search ............... 296/37.1, 296/37.6, 37.5, 39.2; 224/402, 403, 404
See application file for complete search history.

(56) References Cited

U.S. PATENT DOCUMENTS

| | | | | |
|---|---|---|---|---|
| 2,898,146 A | * | 8/1959 | Yudenfreund | 296/39.1 |
| 4,047,749 A | * | 9/1977 | Lambitz et al. | 296/39.2 |
| 4,279,439 A | * | 7/1981 | Cantieri | 296/39.2 |
| 4,341,412 A | * | 7/1982 | Wayne | 296/39.2 |
| D271,009 S | * | 10/1983 | Fishler | 296/39.2 |
| 4,657,177 A | * | 4/1987 | Karabedian | 229/137 |
| 4,693,507 A | | 9/1987 | Dresen et al. | |
| 4,718,584 A | * | 1/1988 | Schoeny | 296/37.5 |
| 4,733,899 A | | 3/1988 | Keys | |
| 4,875,730 A | | 10/1989 | Justice | |
| 4,890,874 A | * | 1/1990 | Davis | 296/39.2 |
| 4,893,862 A | * | 1/1990 | Hollenbaugh, Sr. | 296/39.1 |
| 5,044,682 A | | 9/1991 | Wayne | |
| 5,110,171 A | * | 5/1992 | Anthony | 296/39.2 |
| 5,167,434 A | | 12/1992 | Bott | |
| 5,265,993 A | | 11/1993 | Wayne | |

(Continued)

FOREIGN PATENT DOCUMENTS

JP        6212478        1/1987

(Continued)

*Primary Examiner*—H. Gutman
(74) *Attorney, Agent, or Firm*—Robert L. Knechtel (57) ABSTRACT

The present invention is an integrated storage compartment for a truck bed liner. A divider panel and an enclosure panel are formed by either molding or cutting slits on three sides of the liner bottom or rear wall, respectively. The fourth sideforms a living hinge. The living hinge allows the unattached portion of the truck bed liner bottom to move freely about the hinge. The side walls of the truck bed liner include receiving channels into which the divider and enclosure panels are locked into place. The side walls also have a closure means which comprise horizontal protrusions that form a closure channel to receive the enclosure panel. Thus, an operator can position the divider panel to a 90 position with respect to the bottom and lock it into the receiving channels found on the side walls. The enclosure panel is rotated to a 90 position with respect to a base panel and is inserted into the closure means to form, in conjunction with the divider panel, an enclosed trunk storage compartment. When the trunk storage compartment is no longer needed, the enclosure and divider panels can be removed from the Side wall channels and secured into a flat, horizontal position. An alternate embodiment includes the use of two living hinges. The principles apply to any type of vehicle storage area. An alternate embodiment applying the principles directly to a truck bed or vehicle storage area is also provided.

18 Claims, 9 Drawing Sheets

U.S. PATENT DOCUMENTS

| | | | |
|---|---|---|---|
| 5,372,396 A | * 12/1994 | Van Nahmen | 296/37.5 |
| 5,415,506 A | 5/1995 | Payne | |
| 5,456,514 A | 10/1995 | Justice | |
| 5,464,264 A | * 11/1995 | Wilson | 296/37.6 |
| 5,570,921 A | * 11/1996 | Brooker | 296/37.5 |
| 5,599,055 A | * 2/1997 | Brown | 296/37.6 |
| 6,120,076 A | * 9/2000 | Adsit et al. | 296/37.6 |
| 6,135,527 A | * 10/2000 | Bily | 296/37.6 |
| 6,186,575 B1 | * 2/2001 | Fisher et al. | 296/37.6 |
| 6,308,873 B1 | * 10/2001 | Baldas et al. | 224/281 |

FOREIGN PATENT DOCUMENTS

JP        2127141        5/1990

\* cited by examiner

TRUCK BED LINER WITH STORAGE COMPARTMENT

RELATED APPLICATION

This is a Continuation-In-Part application of Parent application Ser. No. 08/870,334, filed Jun. 6, 1997, now U.S. Pat. No. 6,015,178, issued Jan. 18, 2000.

FIELD OF THE INVENTION

This invention relates to truck bed liners and, more particularly, to a truck bed liner having a storage compartment within the Truck Bed.

BACKGROUND OF THE INVENTION AND PRIOR ART

Liners protect the interior surfaces of pickup truck beds. They prevent or minimize scratching and denting of the truck bed and, thereby, help to maintain the appearance of the truck and increase the resale value of the truck. Liners typically cover the entire bed of the truck, with a separate section affixed to the interior surface of the tail gate. Bed liners are usually made from vacuum formed plastic which is molded to fit the contours of a truck bed. Most liners also have multiple corrugations found throughout the liner surface. The corrugations serve multiple purposes including serving as channels for water drainage, increasing structural strength, and providing an additional cushion between the liner and the truck bed. Examples of truck bed liners are seen in U.S. Pat. No. 4,693,507 to Dresen et al., Japanese Patent No. 62-12478 (A) to Mitsuo, and Japanese Patent No. 2-127141(A) to Jungi.

While truck bed liners offer adequate protection to the truck bed itself, items stored in liners are free to slide around. During sudden stops, the items may be damaged or turned into projectiles that can cause injury. Over the years, attempts have been made to create dividers that compartmentalize truck beds. Items can then be stored in a compartmentalized section of the truck bed, thereby decreasing the risk of damage to items stored in the bed and injury to persons who might be hit by flying items. Prior art solutions have relied upon a separate divider unit inserted at a predetermined point in the bed. Examples are seen in U.S. Pat. No. 5,167,434 to Bott, U.S. Pat. No. 5,415,506 to Payne, U.S. Pat. Nos. 5,265,993 and 5,044,642, both to Wayne, U.S. Pat. No. 4,733,899 to Keys, and U.S. Pat. Nos. 4,875,730 and 5,456,514, both to Justice.

In addition to compartmentalizing bed liners to prevent unwanted sliding, it is also often desirable to cover items in a truck bed to protect them from the elements and to keep them from blowing away. Historically, covering has been accomplished through the use of tarps, or a separate box inserted into the truck bed. Both of these covering means require that the cover be carried separately. Also, tarps may also blow about if not properly secured and the box takes up valuable storage space.

There is a need, therefore, for a simple, economical means to create a covered storage compartment in a truck bed. The means should be fully integrated and not require the user to carry unnecessary pieces or use valuable storage space when the compartment is not needed.

SUMMARY OF THE INVENTION

The instant invention is a truck bed liner having an integrated trunk storage compartmentalization system. According to the invention, a truck bed liner of the general type having two side walls, a front wall, a bottom, and a rear wall is used. The bottom of the truck bed liner is co-formed to the front of the truck bed liner. The liner bottom is also co-formed to the liner side walls. At a predetermined location in the liner bottom is found at least one divider panel. Divider panels are formed either by molding or cutting slots into the liner bottom creating a three-sided flap having a generally square or rectangular appearance. The fourth side is molded or cut into a living hinge. The living hinge allows the unattached portion of the truck bed liner bottom to move freely about the living hinge. The side walls of the truck bed liner include receiving channels into which the divider panels are locked into place.

The rear wall is generally a separate piece affixed to a tail gate or hatch, but may also be integrated to the bottom of the liner. The rear wall includes an enclosure panel. The enclosure panel includes a living hinge that enables the enclosure panel to move freely. The side walls of the truck bed liner further include horizontal protrusions that form a closure channel into which the enclosure panel is received and secured into place when the enclosure panel is used to form the trunk storage compartment.

In operation, an operator can position the divider panel to a 90 degree position with respect to the bottom and lock it into the receiving channels found on the side walls. The enclosure panel is then rotated 90 degrees with respect to the tail gate when in a closed position such that the enclosure panel may be inserted into the closure channel to form, in conjunction with the divider panel, a trunk storage compartmentalization. When the enclosed trunk storage compartmentalization is no longer needed, the enclosure and divider panels can be detached from the side wall channels and returned and locked into the original, flat horizontal position.

In an alternate embodiment, the divider is located in the bottom of the bed liner near the front and the enclosure panel is located in the front wall of the bed liner.

In another embodiment, the divider is located in the bottom of the bed liner perpendicular to the front wall and the enclosure panel is located in the side wall of the bed liner.

In another embodiment, a single section of the liner bottom having two living hinges is used, thereby, enabling the formation of a trunk storage compartment by creating a vertical wall with one of the living hinges and a horizontal cover with the second living hinge.

In another embodiment, a single section of the liner bottom having two living hinges is used, thereby, enabling the formation of a trunk storage compartment with the side wall by creating a vertical wall with one of the living hinges and a horizontal cover with the second living hinge.

In another embodiment of the invention, the storage compartment is molded directly into the composite materials that make up the truck bed. In this embodiment, all of the aforementioned variations can be utilized. Additionally, in this composite truck bed embodiment, a divider can be molded into the truck bed, the divider creating a compartment within the truck bed.

OBJECTS OF THE INVENTION

It is a primary object of the present invention to create a truck bed liner that has an integrated trunk storage compartmentalization feature. The truck bed liner has generally a front wall, two side walls, a bottom, and a back wall. A divider panel and an enclosure panel are each molded or cut into the truck bed liner such that the divider panel and enclosure panel can be secured to the side walls and, thereby, in combination, form a trunk storage compartment. It is another object of the present invention to create a truck bed liner that has a locking means to hold the divider panel in place when positioned at 90 degrees from the horizontal. It is still another object of the present invention to create a truck bed liner that has a side wall with a closure channel to releasably retain the enclosure panel to secure and enclose the storage of items within a trunk storage compartment. It is still another object of the present invention to provide a truck bed liner in which the trunk storage compartment is easy to assemble and disassemble. A related object of the present invention is to provide a trunk storage compartment that is formed from an integrated unit within the truck bed liner.

It is still a further object of the present invention to provide a storage compartment and a divider that are formed directly into the truck bed itself, without the need for a liner.

It is still a further object of the present invention to provide a truck bed liner with an integrated trunk storage compartmentalization feature which is economical to manufacture and produce.

Other objects of the present invention will become more apparent to persons having ordinary skill in the art to which the present invention pertains from the following description taken-in conjunction with the accompanying drawings.

BRIEF DESCRIPTION OF THE DRAWINGS

The Description of the Preferred Embodiment will be better understood with reference to the following figures.

DESCRIPTION OF THE PREFERRED EMBODIMENT

The description of the preferred embodiment is directed to pickup truck bed liners. It should be understood, however, that the principles of the inventive device can just as easily be adapted to liners for use in sport utility vehicles, station wagons, passenger motor vehicle trunks, and the like. It also should be understood that the principles of the inventive device can just as easily be adapted for use directly in truck beds made of composite materials, thereby eliminating the need for a liner.

Figure 1:
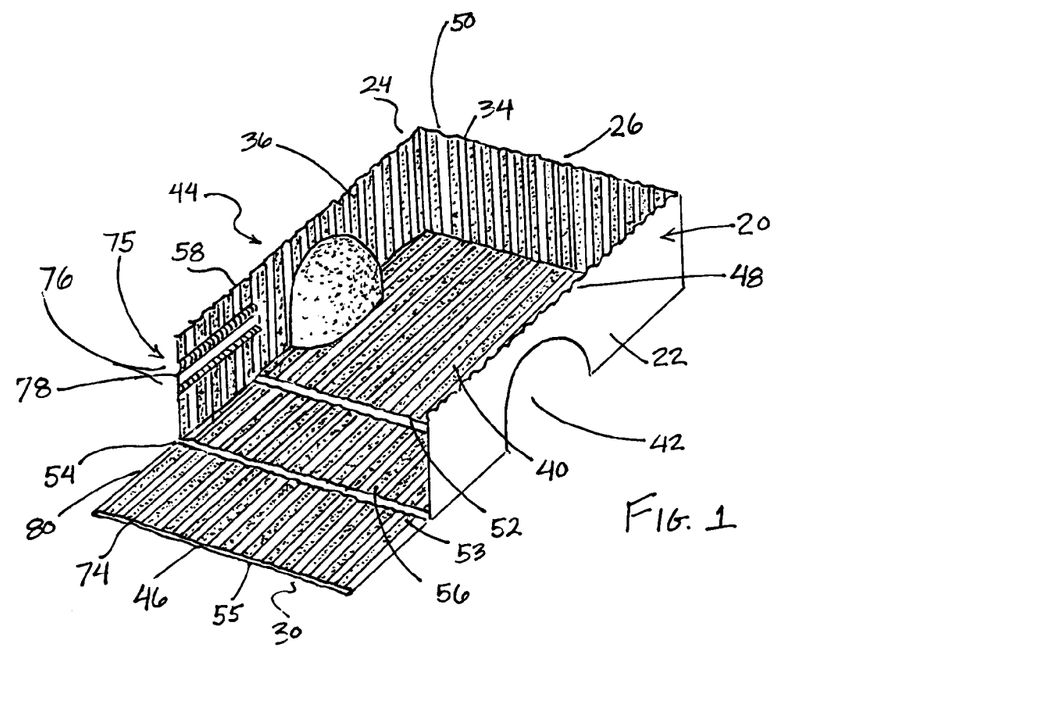
FIG. 1 depicts the inventive device illustrating the divider panel and enclosure panel in a flat position along the horizontal.

Referring to FIG. 1, a truck bed liner 20 having a liner front wall 34, liner side walls 36, 38, a liner bottom 40, and a tail gate liner section 46 is depicted. Liner 20 is preferably made of a lightweight, flexible semi-ridged material such as Acrylonitrile-Butadiene-Styrene ("ABS") plastic; however, any of the commonly used industry materials may be utilized. Truck bed liners are typically molded through a thermal form process. This process works for the present invention as well. However, the molding process or materials used is not critical to the invention.

The truck bed liner is molded to generally fit the contour of a truck bed, including wheel well shrouds 42. Liner bottom 40 is co-formed to liner front wall 34 at 48. Liner bottom 40 is coformed to liner side walls 36, 38 at 50 beginning at a point adjacent liner front wall 34 to a first predetermined point on side walls 36, 38. At the first predetermined point is found living hinge 52. Living hinge 52 extends from liner side wall 36 to opposite liner side wall 38. Liner bottom 40 extends to the rear of a living hinge 52 to a second predetermined point 53. Between living hinge 52 and second predetermined point 53, liner bottom 40 is not attached to liner side walls 36, 38. At second predetermined point S3 is found free edge 54. Free edge 54 extends from liner side wall 36 to liner side wall 38. Along free edge 54 is optionally found horizontal protrusion 55 along its edge. Horizontal protrusion 55 provides strength to the divider. The perimeter formed by the unattached portion of liner bottom 40 and living hinge 52 comprises divider panel 56.

Tail gate liner section 46 is attached to tail gate 30. Tail gate liner section 46 may be separate from or molded directly to liner 20. Tail gate liner section 46 approximates the size and shape of tail gate 30. Tail gate liner section 46 has four sides. On one side, tail gate liner section 46 has a slider edge 80 adjacent to and parallel free edge 54 of bottom 40. Opposite slider edge 80, tail gate liner section 46 has a living hinge 74.

Liner side walls 36, 38 have closure means 75. Closure means 75 is located between first predetermined point with living hinge 52 and second predetermined point 53. Closure means 75 comprises horizontal protrusions 76. Horizontal protrusions 76 are spaced equidistant apart to form a uniform closure channel 78 which is positioned adjacent to divider vertical lock means 58. Closure channel 78 is approximately the same length as horizontal protrusions 76.

Figure 2:
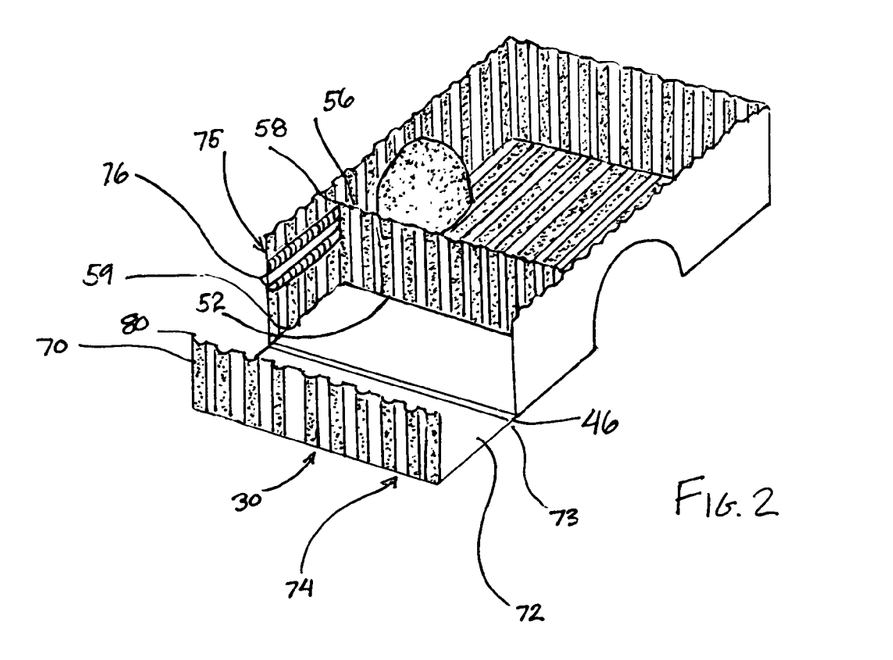
FIG. 2 depicts the divider panel locked into position at 90° from horizontal and the enclosure panel rotated to 90° from horizontal prior to forming the trunk storage compartmentalization within the truck bed liner.

Turning to FIG. 2, it can be seen that divider panel 56 can be raised to 90 off horizontal along living hinge 52 where it is then locked into place using divider vertical lock means 58. Tailgate liner section 46 a shown with an enclosure panel 70 and a base panel 72 that are hingedly connected by a living hinge 74. Living hinge 74 permits enclosure panel 70 to freely rotate with respect to base panel 72. Preferably, enclosure panel 70 is releasably affixed a base panel 72 VELCRO®—73—, namely a hook and loop type of fasteners and components manufactured by Velcro, Inc. having, upon information and belief, place of business in Manchester, N.H. Alternatively, enclosure 70 may be releasably affixed to base panel 72 by any other means that would permit panels to releasably secure together. Typically, base panel 72 is attached to tailgate 30. Alternatively, base panel 72 may be integrally molded to liner bottom 40 of truck bed liner 20. Enclosure panel 70 is rotated, along living hinge 74, and approximately 90 position with respect to base panel 72. In this position, enclosure panel 70 is set for insertion into closure means 75 to form the enclosed trunk storage compartmentalization. Obviously, divider panel 56 and enclosure panel 70 must be of a size and at and a location that they create an enclosed area when in a raised position.

Figure 3:
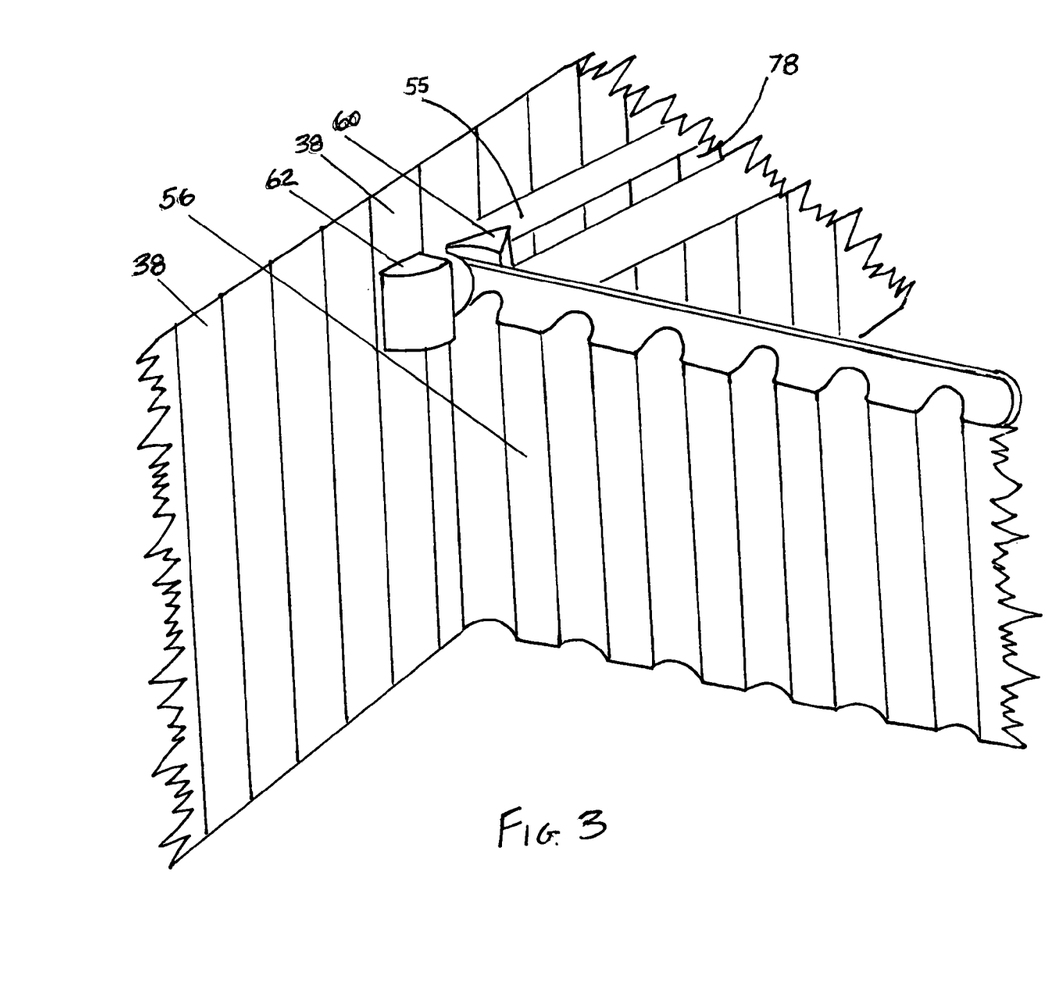
FIG. 3 shows a fractionalized view of a divider panel in a 90° raised position illustrating the locking mechanism.
Figure 4:
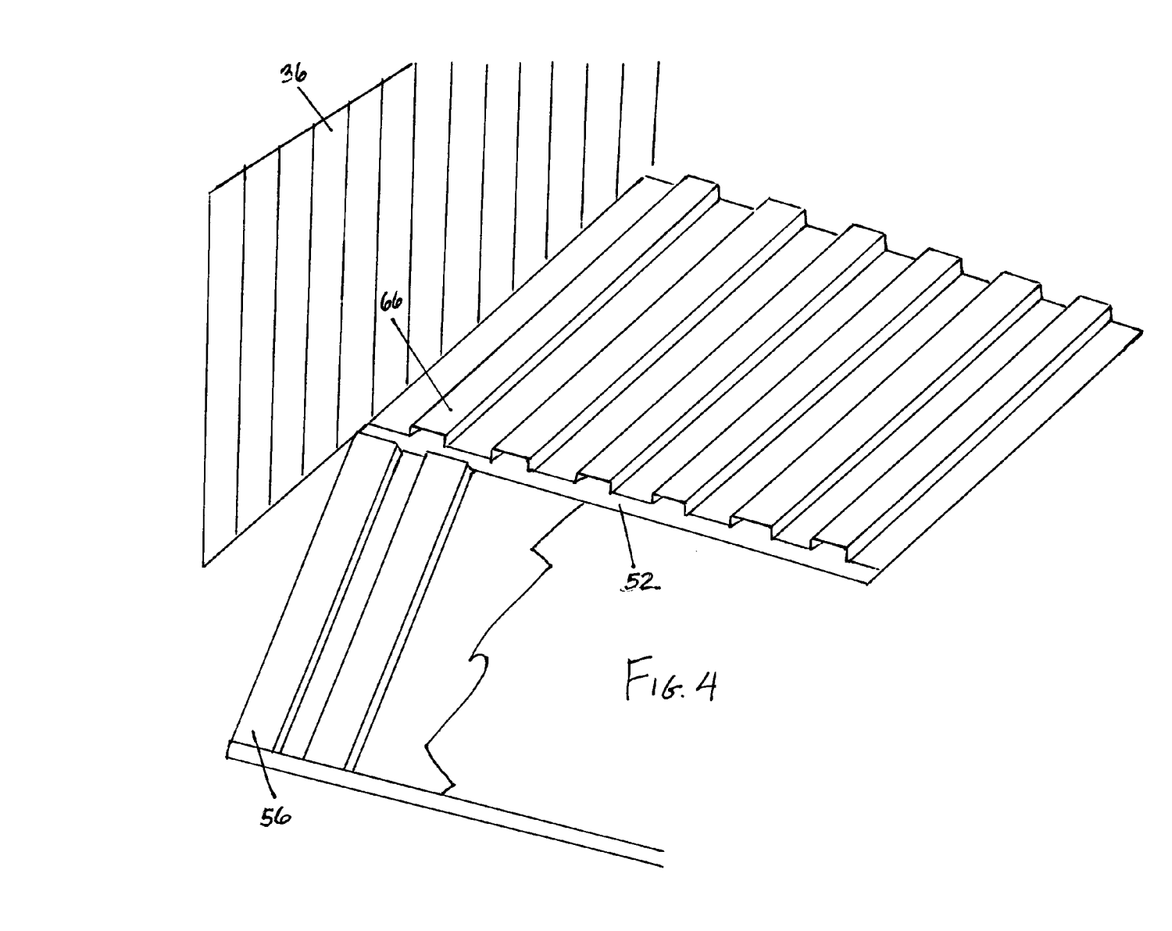
FIG. 4 is a fractionalized view illustrating an exaggerated view of a divider panel pushed past the lower latch means.
Figure 9:
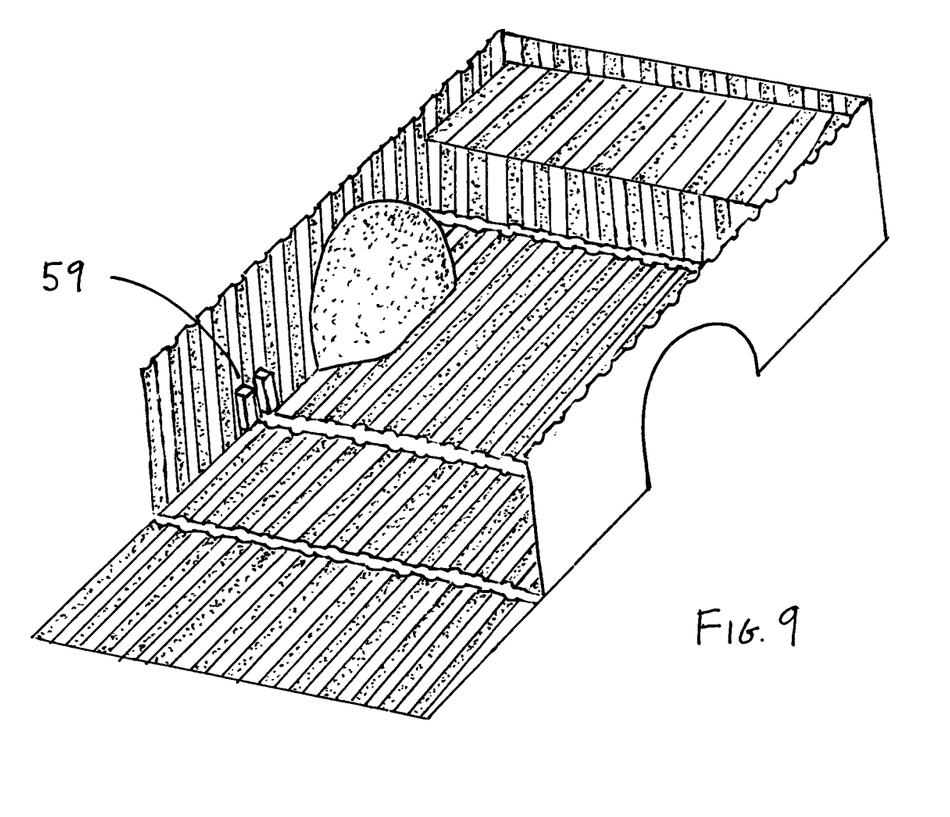
FIG. 9 depicts an alternate embodiment of the inventive device in its assembled configuration illustrated as located in the forward section of the truck bed liner.

Turning to FIG. 3, it can be seen that vertical divider lock means 58 consists of front lock portion 60 and rear lock portion 62. Front lock portion 60 and rear lock portion 62 protrude from liner side walls 36, 38 to a point sufficient to maintain divider panel 56 securely in place. Front lock portion 60 and rear lock portion 62 are spaced apart from one another a sufficient distance to accept divider panel 56 and hold divider panel 56 in position. Divider panel 56 is placed into divider vertical lock means 58 by "snapping" it into place. To remove divider panel 56 from divider vertical lock means 58, pressure is applied to a point along divider panel 56 at horizontal protrusion 55 such that divider panel 56 begins to bow and, thereby, allow divider panel 56 to be removed from divider vertical lock means 58. When placed into its horizontal storage position, divider panel 56 is secured into place by lower latch means 59. As seen in FIG. 9, latch means 59 protrudes from each liner side wall 36, 39 near the lower aspect of each side wall.

Figure 5:
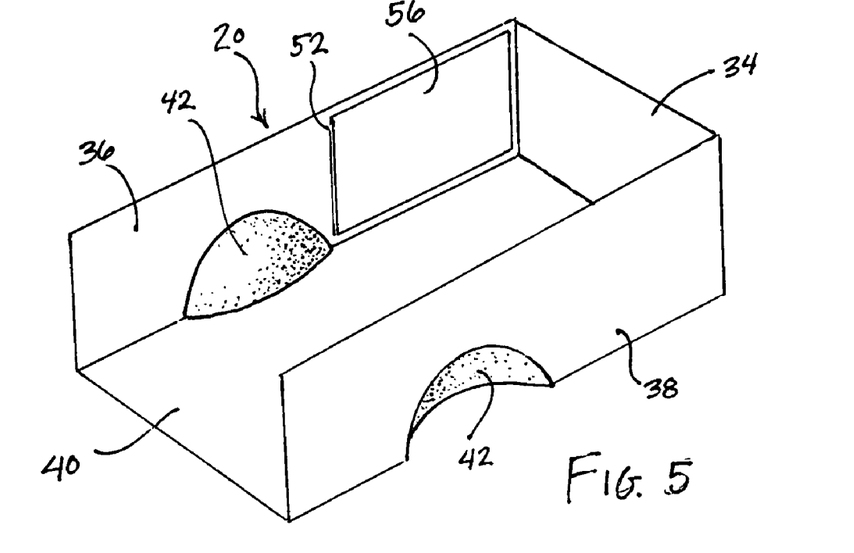
FIG. 5 depicts the inventive device wherein the divider panel is created from the liner side wall.
Figure 6:
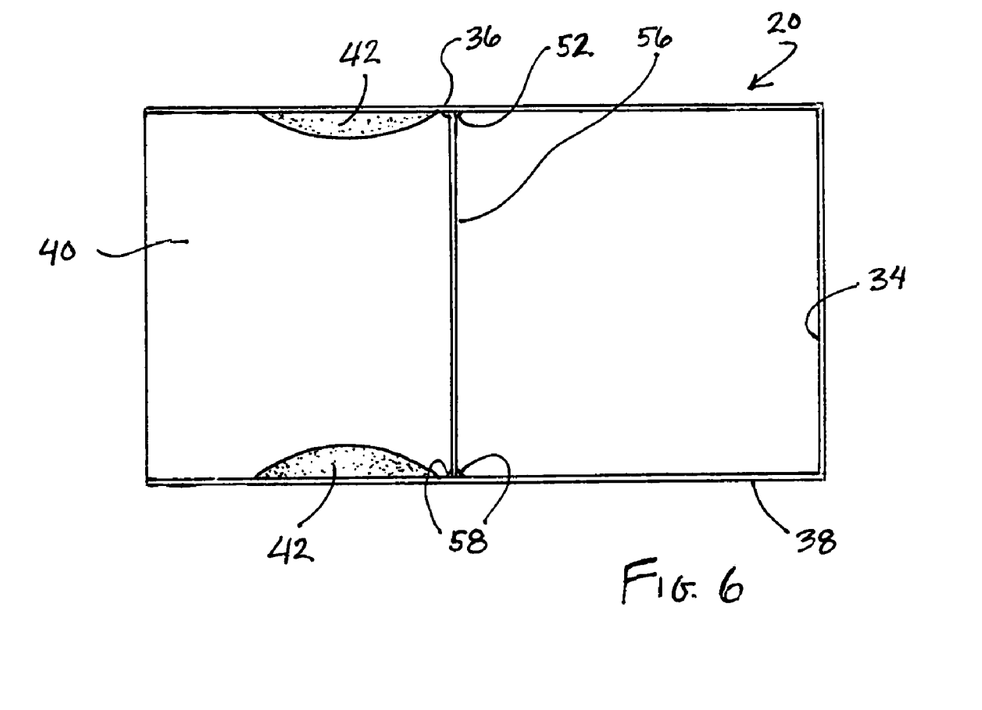
FIG. 6 depicts a top view of the divider panel in its assembled configuration as integrated from the liner side wall.

FIG. 5 illustrates that divider panel 56 may also be molded or cut into the liner side walls 36, 38 of truck bed liner 20. In this embodiment, divider panel 56 is formed into one wall, either liner side wall 36 or liner side 38, which permits divider panel 56 to pivot about living hinge 52 on the horizontal axis and then be secured into place by a divider lock means 58 found on the opposite liner side wall as illustrated in FIG. 6. The disadvantage of this embodiment is that the side wall surface available to mold or cut a divider may nor be sufficient to completely bridge liner bottom 40 between liner side wall 36 and liner side wall 38 of truck bed liner 20. To address this problem, two divider panels, each of which is of a length equal to one-half the length of the liner may be used. In this manner, the two divider panels can join in the center of the bed to form a single divider panel.

Figure 7:
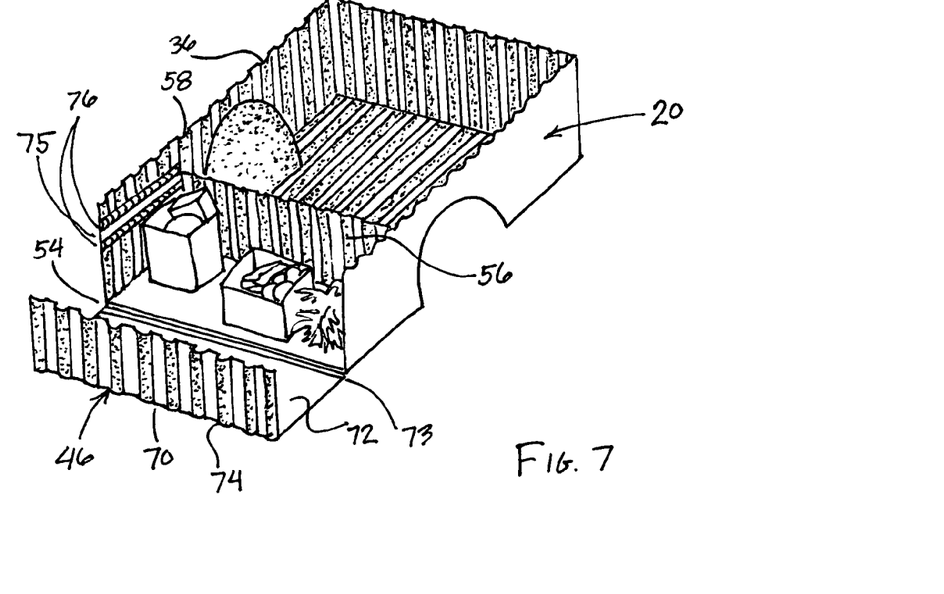
FIG. 7 depicts the inventive device wherein the divider panel is in a 90 locked position from the horizontal illustrating the placement of the storage of items within the trunk storage compartment prior to enclosure by the enclosure panel.

FIG. 7 depicts a representative example of items stored in the compartment created when divider panel 56 is in a raised position and locked into position and by divider lock means 58 and prior to enclosure panel 70 being received into closure means 75 to complete the trunk storage compartment.

In operation, to create the trunk storage compartmentalization, divider panel 56 is rotated from the horizontal position to an essentially vertical position and locked into vertical divider lock means 58, as discussed above in FIG. 3. Enclosure panel 70 is removed from base panel 72 by applying sufficient pressure on enclosure panel 70 in direction away from base panel 72 to release closure panel 70 from base panel 72. Upon release, enclosure panel 70 rotates away from base panel 72 along living hinge 74. Base panel 72 is then rotated from the vertical position to an essentially horizontal position through lifting and closing of tailgate 30. During the lifting and closing of tailgate 30 to a closed vertical position, enclosure panel 70 is received into closure means 75 by sliding edge 80 of enclosure panel 72 being inserted between horizontal protrusions 76 and a closure channel 78. Upon tailgate 30 reaching the closed vertical position, enclosure panel 72 is completely inserted into closure channel 78 such that sliding and 80 is essentially flush with divider panel 56 and enclosure panel 70 is approximately perpendicular to divider panel 56.

Figure 8:
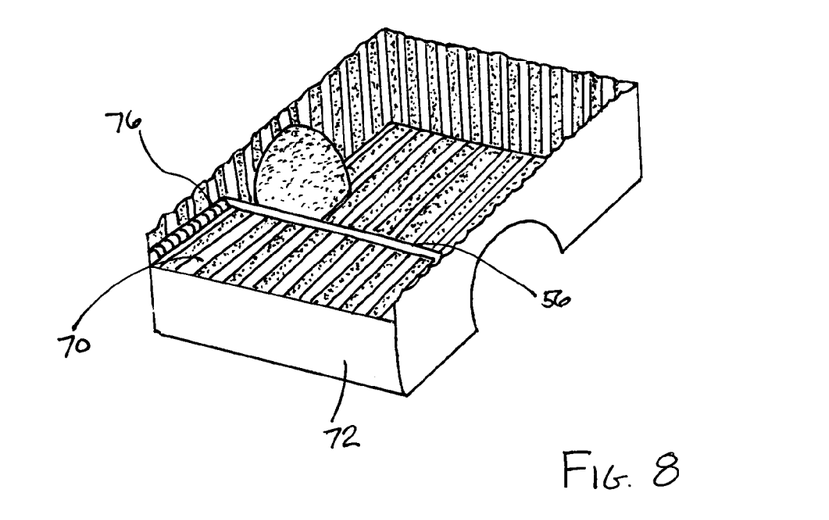
FIG. 8 depicts the inventive device in its assembled configuration.

The resulting trunk storage compartment is illustrated in FIG. 8 in which the items within the compartment are prevented from unrestricted movement by divider panel 56 and base panel 72 co-acting as the sides of the compartment and enclosure panel 70 acting as the top of the compartment to protect the items from inclement weather, such as rain. The same inventive concept may be used to form the trunk storage compartment in the forward section of liner 20 as illustrated in FIG. 9.

Figure 10:
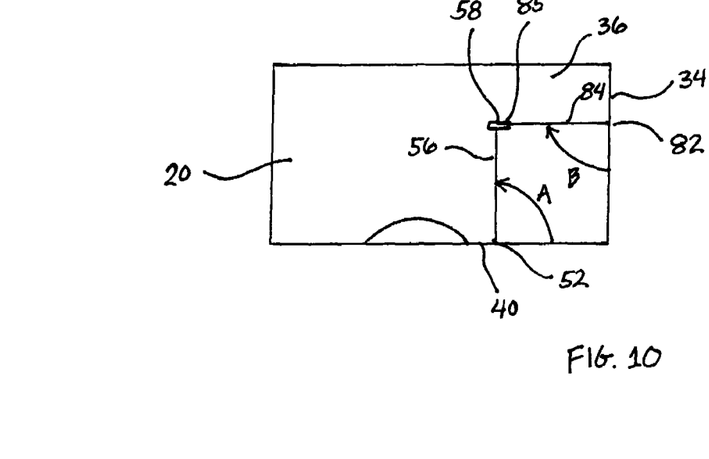
FIG. 10 depicts a side sectional view of the alternate embodiment of FIG. 9 in assembled configuration illustrating the front wall enclosure panel and the divider panel forming the trunk storage compartment.

Turning to FIG. 10, it is contemplated that liner front wall 34 and the liner bottom 40 may be used to create a trunk storage compartmentalization within the truck bed liner 20. Liner bottom 40 is provided with divider panel 56 at a predetermined location from liner front wall 34 at living hinge 52. Divider panel 56 extends from liner front wall 34 to living hinge 52. Liner side walls 36, 38 are correspondingly provided with divider vertical lock means 58. Liner front wall 34 is provided with a front wall enclosure panel 84. Liner front wall 34 is molded or cut so as to not co-form on its three sides to liner bottom 40 or liner side walls 36, 38; but instead, is provided, on its fourth side, with a living hinge 82 attached to the liner 20. Divider panel 56 may be rotated, along living hinge 52, in a direction through rotation A to a 90 with respect to the horizontal and liner bottom 40 and locked in a vertical position to liner side walls 36, 38 by divider vertical lock means 58. Front wall enclosure panel 84 may be rotated in a direction through rotation B, along the living hinge 82, from a vertical position to a horizontal position and secured to a front wall latch means 85 protruding from liner side walls 36, 38 adjacent to divider vertical lock means 58. Alternatively, front wall enclosure panel 84 and divider panel 56 may be secured using a single latch means. In this manner, liner front wall 34 acts as the enclosure panel and divider panel 56 and liner 20 coact as the sides to form the trunk storage compartment. Preferably, front wall enclosure panel 84 is approximately equal in length to divider panel 56. Alternatively, the length of front wall enclosure panel 84 and position of living hinge 82 may be greater or smaller, if desired, as long as the length of divider panel 56 and position of living hinge 52 are correspondingly made greater or smaller.

Figure 11:
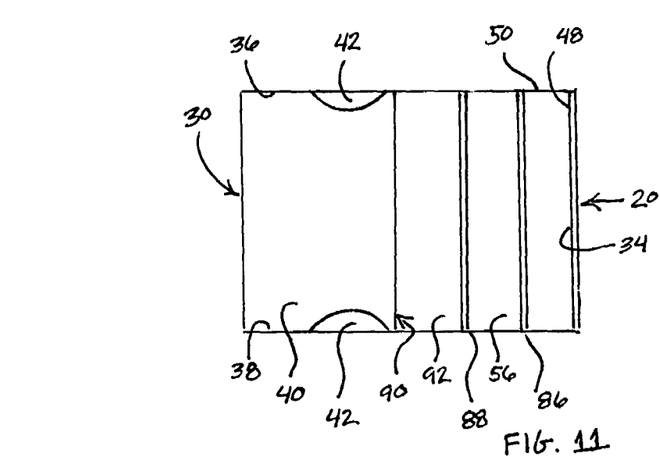
FIG. 11 depicts a top view of the alternate embodiment in which the liner bottom is used in conjunction with multiple living hinges to form the trunk storage compartment in the forward section of the truck bed liner.

Alternatively, turning to FIG. 11, liner bottom 40 is co-formed to liner front wall 34 at 48. Liner bottom 40 is co-formed to liner side walls 36, 38 at 50 beginning at a point adjacent liner front wall 34 to a first predetermined point on side walls 36, 38. At the first predetermined point is found living hinge 86. Living hinge 86 extends from liner Side wall 36 to opposite liner Side wall 38. Liner bottom 40 extends from living hinge 86 to second predetermined point in which a second living hinge 88 is located to form divider panel 56. Liner bottom 40 continues to extend from second predetermined point 88 to free edge 90 to form enclosure panel 92. The length of divider panel 56 and enclosure panel 92 may be greater or smaller, if desired, so long as the combined length of divider panel 56 and enclosure panel 92 do not exceed the height of front wall 34. Preferably, free edge 90 is located in the forward section of liner 20 along with liner front wall 34 and adjacent shroud 42. Between living hinge 86 and free edge 90, liner bottom 40 is not attached to liner side walls 36, 38.

Figure 12:
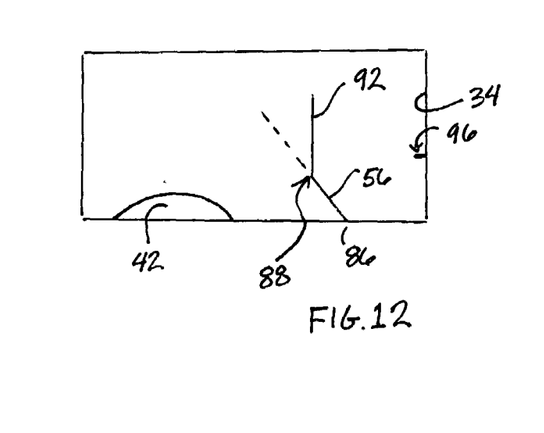
FIG. 12 depicts a side sectional view of the alternate embodiment in which the enclosure and divider panels are raised from the horizontal position prior to forming the trunk storage compartment with the liner front wall.
Figure 13:
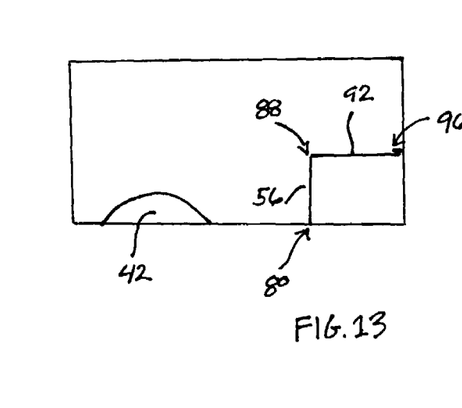
FIG. 13 depicts a side sectional view of the alternate embodiment in its assembled configuration as formed by the liner bottom.

Turning to FIG. 12, to form the trunk storage compartment, enclosure panel 92 of liner bottom 40 is raised to a 90 position with respect to the horizontal. Enclosure panel 92 is situated at an angle 94 with respect to divider panel 56. Angle 94 is approximately 45 degree with respect to divider panel 56. The rotation of enclosure panel 92 about divider panel 56 is accomplished by second living hinge 88. Divider panel 56 is correspondingly raised to a 45 degree position with respect to the horizontal which is accomplished by first living hinge 86. Front wall 34 is affixed with a latch means 96. The formation of the trunk storage compartment is completed, as illustrated in FIG. 13, by rotating divider panel 56, along living hinge 86, to a 90 position with respect to the horizontal and liner bottom 40.

Figure 14:
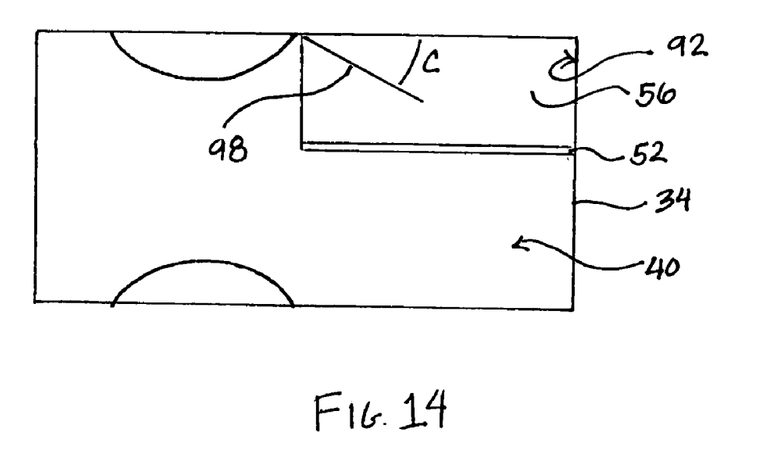
FIG. 14 depicts a top view of the divider panel with a living hinge within liner bottom and the liner side wall to create the sides of the trunk storage compartment with the enclosure panel being formed from the liner front wall.

An alternate embodiment may be accomplished using the same inventive concept as illustrated in FIG. 14 by providing liner bottom 40 with a divider panel 56 and a living hinge 52 and liner side wall 36 or liner side wall 38 with a side panel 98 to form the sides of the trunk storage compartment with enclosure panel 92 being located within liner front wall 34.

Figure 15:
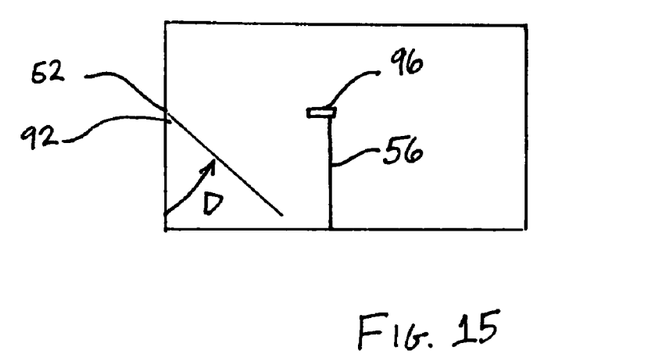
FIG. 15 depicts a rear view of the divider panel raised from the horizontal position from the liner bottom and the enclosure panel in the liner side wall being raised to form the trunk storage compartment.

As illustrated in FIG. 15, yet another embodiment may also be accomplished without liner side wall 36, 38 providing a side panel 98 (of FIG. 14). Instead, the side walls provide an enclosure panel 92 that has a living hinge 52 located on liner side walls 36 or 38 to rotate from a vertical position to a horizontal position for attachment to latch means 96 located along front liner wall 34 with divider panel 56 being rotated to a vertical position from its horizontal position within liner bottom 40.

Figure 16:
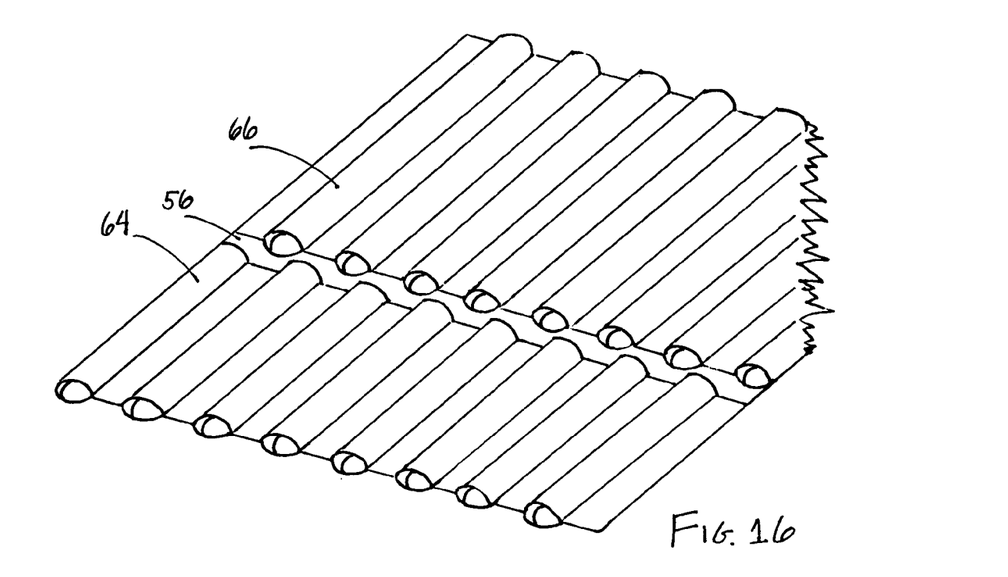
FIG. 16 is a fractionalized view illustrating the offset molding features of the device in a rounded corrugated pattern.
Figure 17:
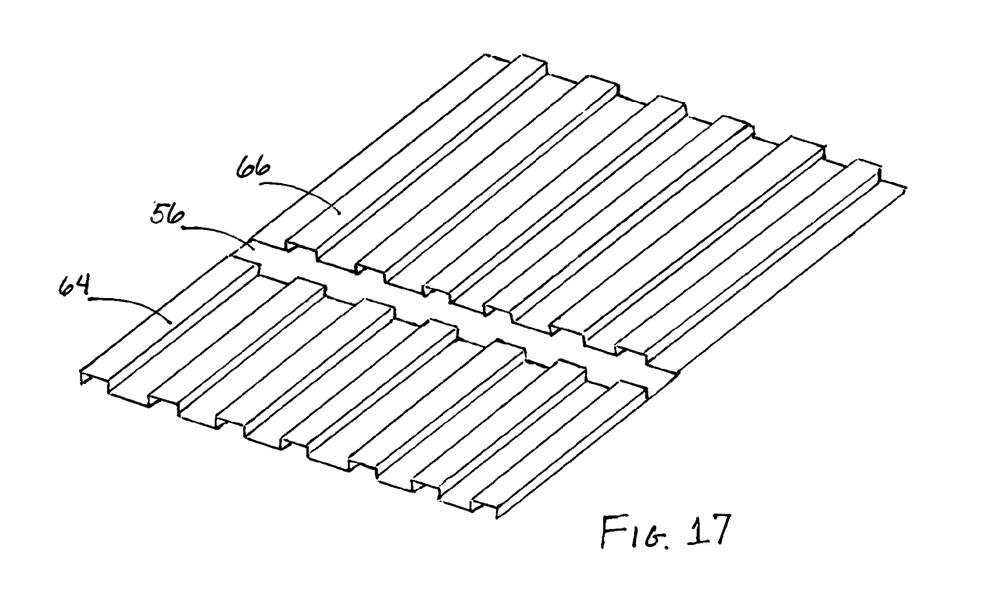
FIG. 17 depicts an alternate embodiment illustrating the offset molding feature wherein a squared molding pattern is utilized.

FIGS. 16 and 17 are alternate examples of molding techniques used in manufacturing truck bed liner 20. FIG. 16 depicts a rounded molding process while FIG. 17 depicts squared molding process. It should be noted that both in both FIG. 16 and FIG. 17, the corrugations 64 of the divider are offset to the corrugations 66 of the remainder of the truck bed liner bottom 40. This facilitate smooth operation of the device inasmuch when a divider panel 56 is raised from its vertical position to its horizontal position the corrugations of the divider fit between the corrugations of the remainder of the liner bottom. If the corrugations of the divider and remainder of the liner bottom are not offset, they may crush into one another making it difficult to raise the divider into position without damaging the divider. While the preferred embodiment of the inventive device contemplates an offset molding process cutouts enabling the divider to be raised up and over the corrugations of the remainder of the liner bottom are also contemplated. Of course, liner is not using raised corrugations, have no need for offsetting the divider corrugations and the remainder of the bottom.

The principles of the inventive device and the alternate embodiments disclosed above are directed to application with a truck bed liner having a front, back, side walls, and bottom. The principles and alternate embodiments may also be applied to liners possessing only partial bed liner characteristics. For example, a liner comprising only a bed mat to protect the bottom of a bed may be fitted with an integrated divider panel and a separate or co-joined member that enables formation of a cover member in the formation of an enclosure panel.

Further, the same principles and alternate embodiments may be employed directly into the truck bed or vehicle storage area itself, thus, eliminating the need for a liner to form the trunk storage compartment. In this embodiment, the truck bed or vehicle storage area itself may be made of materials which can be adapted to provide the integrated divider and enclosure panels, in all the disclosed embodiments, to form the trunk storage compartments. Additionally, a divider or multiple dividers may be incorporated into the truck bed itself. In this embodiment, the principles discussed in parent application Ser. No. 08/870,334 are applied to the divider in the truck bed.

Thus, there has been provided a truck bed liner with integrated panels to create a trunk storage compartment within a truck bed liner. While the invention has been described in conjunction with a specific embodiment, it is evident that many alternatives, modifications and variations will be apparent to those skilled in the art in light of the foregoing description. Accordingly, it is intended to embrace all such alternatives, modifications and variations as fall within the spirit and scope of the appended claims.

What is claimed is:

1. A storage compartment in a truck bed liner comprising a divider panel hingedly affixed to a liner bottom by a first living hinge, the divider panel thereby enabled to rotate about a horizontal axis to form a vertical wall and an enclosure panel hingedly affixed to a tail gate by a second living hinge, the enclosure panel thereby enabled to rotate about a horizontal axis, the divider panel and the enclosure panel positioned such that when pivoted about their respective axis' form an enclosed compartment.

2. The storage compartment of claim 1 further including a divider panel securing means for positioning and securing the divider panel.

3. The storage compartment of claim 1 further including an enclosure panel securing means for positioning and securing the enclosure panel.

4. The storage compartment of claim 3 wherein the divider panel securing means comprises at least two protrusions extending outwardly from each side wall of the liner at a predetermined point in the side walls such that the at least two protrusions maintain the divider panel in a 90 degree angle with respect to the bottom when the divider panel is in a raised position, the at least two protrusions being spaced apart from one another along the longitudinal axis a sufficient distance that the divider panel can be positioned between the at least two protrusions.

5. The storage compartment of claim 3 wherein the enclosure panel securing means comprises at least two horizontal protrusions extending outwardly from the two side walls of the liner at a predetermined point in the side wall, the at least two horizontal protrusions being spaced apart from one another a sufficient distance to form a closure channel and secure the enclosure panel between the horizontal protrusions.

6. The storage compartment liner of claim 1 wherein the divider panel is located in the bottom of the truck bed liner.

7. The storage compartment of claim 1 wherein the divider panel and the enclosure panel each have three free edges; the divider panel has a fourth edge comprising the first living hinge; and the enclosure panel has a second forth edge comprising the second living hinge.

8. A storage compartment for a truck bed liner comprising:
   an integrated divider panel having at least two living hinges located at predetermined locations on the divider panel, the living hinges enabling the divider panel to be raised into a vertical position at one of the at least two living hinges and horizontal position at the second of the at least two living hinges; and panel securing means, whereby, the divider panel can be positioned and secured to form a trunk storage compartment.

9. A storage compartment in a vehicle liner comprising a divider panel hingedly affixed to a liner bottom by a first living hinge, the divider panel thereby enabled to rotate about a horizontal axis to form a vertical wall and an enclosure panel hingedly affixed to a tail gate by a second living hinge, the enclosure panel thereby enabled to rotate about a horizontal axis, the divider panel and the enclosure panel positioned such that when pivoted about their respective axis form an enclosed compartment.

10. The storage compartment of claim 9 further including a divider panel securing means for positioning and securing the divider panel.

11. The storage compartment of claim 10 wherein the divider panel securing means comprises at least two protrusions extending outwardly from each side wall of the liner at a predetermined point in the side walls such that the at least two protrusions maintain the divider panel in a 90 degree angle with respect to the bottom when the divider panel is in a raised position, the at least two protrusions being spaced apart from one another along the longitudinal axis a sufficient distance that the divider panel can be positioned between the at least two protrusions.

12. The storage compartment of claim 9 further including an enclosure panel securing means for positioning and securing the enclosure panel.

13. The storage compartment of claim 12 wherein the enclosure panel securing means comprises at least two horizontal protrusions extending outwardly from the two side walls of the liner at a predetermined point in the side wall, the at least two horizontal protrusions being spaced apart from one another a sufficient distance to form a closure channel and secure the enclosure panel between the horizontal protrusions.

14. The storage compartment of claim 9 further comprising a base panel, the base panel having a first side and a second side, the enclosure panel being releasably affixed to the first side of the base panel when the enclosure panel is not within the enclosure securing means.

15. The storage compartment of claim 9 wherein the divider panel and the enclosure panel each have three free edges; the divider panel has a fourth edge comprising the first living hinge; and the enclosure panel has a second forth edge comprising the second living hinge.

16. An enclosed storage compartment comprising a divider panel hingedly affixed to a liner bottom by a first living hinge, the divider panel thereby enabled to rotate about a horizontal axis to form a vertical wall and an enclosure panel hingedly affixed to a tail gate by a second living hinge, the enclosure panel thereby enabled to rotate about a horizontal axis, the divider panel and the enclosure panel positioned such that when pivoted about their respective axis' form an enclosed compartment.

17. A truck bed made of materials capable of having formed members, the improvement comprising:
    a divider panel and further comprising at least two living hinges located at predetermined locations on the divider panel, the living hinges enabling the divider panel to be raised into a vertical position at one of the at least two living hinges and horizontal position at the second of the at least two living hinges; and panel securing means, whereby, the divider panel can be positioned and secured to form a trunk storage compartment with the bottom and an adjacent side wall.

18. A truck bed generally having a front wall, two side walls, a bottom, and a tailgate, the improvement comprising:
    a hingedly affixed divider and divider securing means, whereby, the divider can be positioned and secured with the divider securing means to compartmentalize the truck bed wherein the divider securing means further comprises at least two protrusions extending outwardly from each side wall of the bed at a predetermined point in the side walls such that the at least two protrusions maintain the divider in a 90° angle when the divider is in a raised position, said protrusions being spaced apart from one another along the longitudinal axis a sufficient distance such that the divider can be positioned between the at least two protrusions and further comprising horizontally divided locking means to maintain the divider in a horizontal position when the divider is not in a raised position.

* * * * *